United States Patent
Galand et al.

(10) Patent No.: US 7,948,982 B2
(45) Date of Patent: May 24, 2011

(54) GATEWAY CONTROLLING ACCESS TO AN ACTIVE NETWORK

(75) Inventors: Damien Galand, Chaville (FR); Olivier Marce, Massy (FR); Yacine El Mghazli, Gentilly (FR)

(73) Assignee: Alcatel Lucent, Paris (FR)

( * ) Notice: Subject to any disclaimer, the term of this patent is extended or adjusted under 35 U.S.C. 154(b) by 2287 days.

(21) Appl. No.: 10/239,072

(22) PCT Filed: Jan. 21, 2002

(86) PCT No.: PCT/FR02/00231
§ 371 (c)(1),
(2), (4) Date: Sep. 20, 2002

(65) Prior Publication Data
US 2003/0169750 A1    Sep. 11, 2003

(30) Foreign Application Priority Data

Jan. 22, 2001  (FR) ..................... 01 00800

(51) Int. Cl.
    *H04L 12/28* (2006.01)
(52) U.S. Cl. ........................ 370/392; 370/401
(58) Field of Classification Search ............ 370/230, 370/392, 401
    See application file for complete search history.

(56) References Cited

U.S. PATENT DOCUMENTS

| | | | |
|---|---|---|---|
| 6,263,372 B1 * | 7/2001 | Hogan et al. ............... | 709/237 |
| 6,621,793 B2 * | 9/2003 | Widegren et al. .......... | 370/230.1 |
| 6,775,231 B1 * | 8/2004 | Baker et al. ................ | 370/230.1 |
| 6,931,026 B1 * | 8/2005 | Lee et al. .................... | 370/468 |
| 7,012,890 B2 * | 3/2006 | Yazaki et al. ............... | 370/229 |
| 7,046,680 B1 * | 5/2006 | McDysan et al. ........... | 370/396 |
| 7,065,578 B2 * | 6/2006 | Garrett et al. .............. | 709/229 |
| 2002/0036983 A1 * | 3/2002 | Widegren et al. .......... | 370/230.1 |
| 2002/0095496 A1 * | 7/2002 | Antes et al. ................ | 709/225 |
| 2003/0105830 A1 * | 6/2003 | Pham et al. ................ | 709/216 |
| 2005/0117576 A1 * | 6/2005 | McDysan et al. ........... | 370/389 |

OTHER PUBLICATIONS

D. Raz et al, "Active Networks for Efficient Distributed Network Management", IEEE Communications Magazine, Mar. 2000, IEEE, USA, vol. 38, No. 3, pp. 138-143, XP002182235.

J. Aweya, "On the design of IP routers Part 1: Router architectures", Journal of Systems Architecture, Elsevier Science Publishers BV, Amsterdam< NL, vol. 46, No. 6 Apr. 2000, pp. 483-511, XP004190486.

* cited by examiner

*Primary Examiner* — Hong Cho
(74) *Attorney, Agent, or Firm* — Sughrue Mion, PLLC

(57) ABSTRACT

An access control gateway (E) for controlling access to a first data network (D), which gateway includes a filter for filtering data coming from a second data network. The filter is adapted to decide whether to transmit the data to the first network as a function of information contained in the data relating to the processing of the data by active routing systems of the first network.

11 Claims, 2 Drawing Sheets

FIG_1
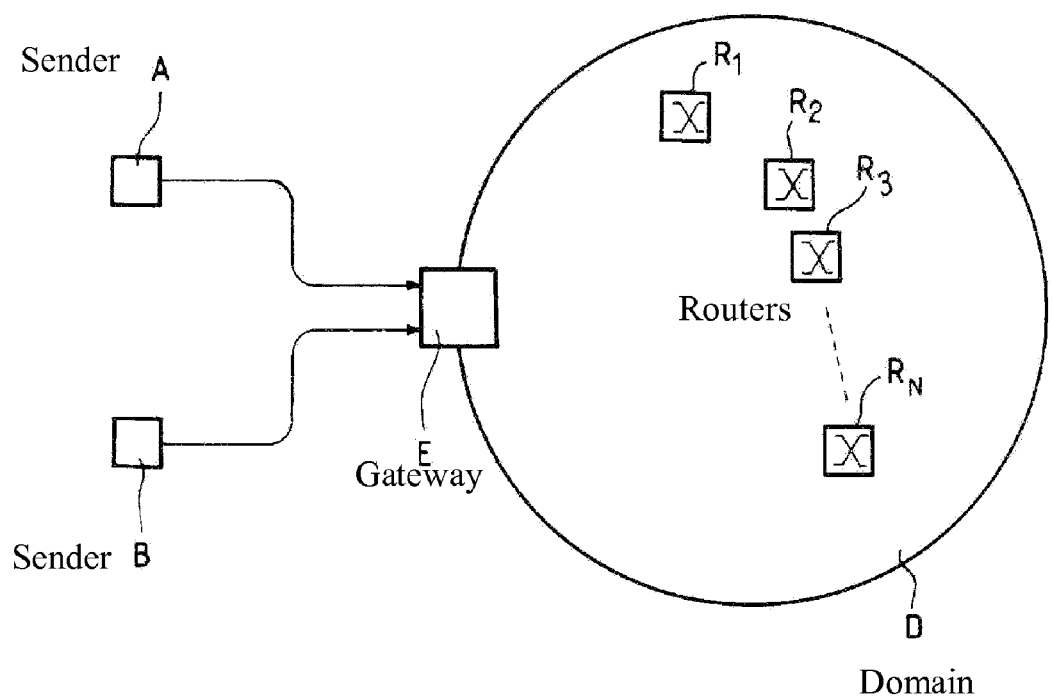

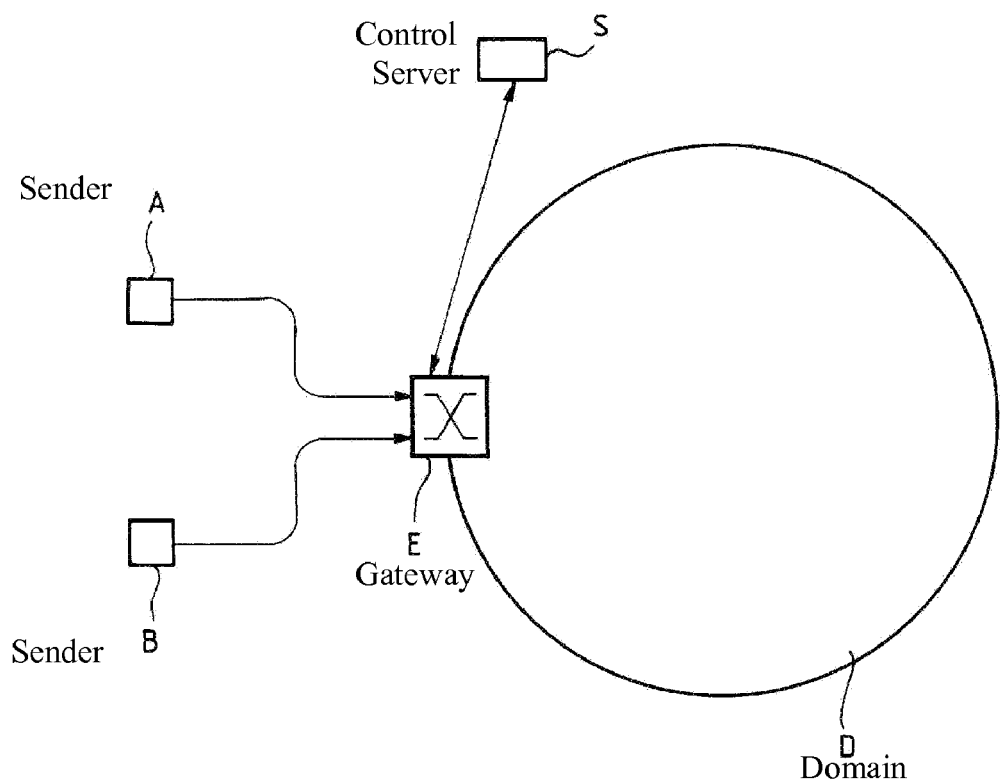

GATEWAY CONTROLLING ACCESS TO AN ACTIVE NETWORK

BACKGROUND OF THE INVENTION

The present invention relates to telecommunications networks whose nodes are capable of processing in a specific way information messages that they receive; to be more precise, it relates to accessing telecommunications networks of the above kind.

The invention applies more particularly to active networks, i.e. networks in which some of the routing systems (nodes) are capable of processing in a specific way at least some of the messages conveyed by the network. In other words, this means that these nodes must be able to run an algorithm other than those known to them at the time they were designed, and that each message received may require processing resources.

Not all the nodes in an active network necessarily have processing capacity: a distinction is therefore drawn between active nodes and non-active nodes, which are usually called passive nodes. Similarly, not all messages require specific processing: a distinction is therefore drawn between active messages and non-active (passive) messages.

Computer and telecommunications networks can be divided into a plurality of domains, also known as sub-networks. This is known in the art. Controlling access to a domain by means of an access control gateway is also known in the art. In Internet Protocol networks the access control gateway is called an edge router and the routing systems (nodes) are called routers.

However, the function of access control gateways is primarily limited to verifying the right to use the bandwidth corresponding to the data transmitted by a sender.

The accompanying FIG. 1 shows the environment of an access control gateway E of the above kind. The access control gateway E administers access to a domain D made up of N nodes $R_1, R_2, R_3, \ldots, RN$. The figure shows two senders A and B of messages, for example host stations or nodes of another domain.

Sender A is not authorized to send messages to the domain D. The access control gateway E therefore blocks messages coming from sender A.

However, sender B is authorized to send messages to the domain D. The access control gateway can therefore pass messages coming from sender B. In a more sophisticated implementation of this access control gateway, it passes only a number of messages corresponding to the bandwidth to which the sender B has subscribed, for example.

It can therefore be seen that the above kind of access control gateway does not administer the processing generated by messages received from senders. If the domain D includes active routing systems, there is nothing to prevent senders A and B sending messages requiring considerable processing resources of the active routing systems.

Also, this can lead to congestion of the active routing systems and therefore collapse of network performance.

Similarly, this lack of control can generate security lapses, since a malevolent sender can render the network inoperative merely by sending messages requiring considerable processing resources.

Obviously, another drawback is the possibility of sending computer viruses that are not checked before they are executed by the routing systems.

SUMMARY OF THE INVENTION

An object of the invention is to alleviate the above problems by checking at the access control gateway the messages entering a domain.

Thus the invention firstly provides an access control gateway for controlling access to a first data network, which gateway includes filter means for filtering data coming from a second data network. It is characterized in that the filter means are adapted to decide whether to transmit the data to the first network as a function of information contained in the data and relating to the processing of the data by active routing systems of the first network.

The invention also provides a method of transmitting to a first network, which is a data network, data coming from a second network, which is an access network, via an access control gateway. This method is characterized in that it includes the following steps:
reading information contained in the data and relating to processing of the data by active routing systems of the first network, and
deciding whether to transmit the data as a function of that information.

BRIEF DESCRIPTION OF THE DRAWINGS

The invention and its advantages will become clearer in the course of the following description of one embodiment of the invention, which is given with reference to the accompanying drawings.

FIG. 1, already commented on, is a diagram showing the environment of an access control gateway.

FIG. 2 shows a second embodiment of the invention.

DETAILED DESCRIPTION OF THE INVENTION

The data received via the access control gateway is conventionally formatted into messages, which are known as packets in the case of the Internet. These messages (packets) include a message body and a header, which comprises a plurality of fields.

The information relating to the processing of the data by the routing systems can be inserted into the header fields of the message or into the body itself.

This information can include:
information on the sender and the receiver or receivers of the message,
information on the execution environment needed to process the message, and
information on whether the message requires specific processing.

The above list is not necessarily comprehensive, and can be added to, in particular as a function of future developments in the technology of active networks.

The information on the sender and the receiver or receivers of the message can conventionally be Internet Protocol (IP) parameters such as IP addresses, port or protocol numbers, etc.

The information on whether the message requires specific processing can simply be a flag indicating if the message in question is an active message or a normal message.

Finally, the information on the execution environment specifies the execution environment required to process the message, for example in the form of identifiers. The execution environment can be an operating system that the routing system must have, for example. It can also specify a version of the operating system, or even supplementary software modules required to process the message, etc.

The manner in which the above information is inserted into the messages is outside the scope of the invention and will be evident to the person skilled in the art. In particular, it can depend in part on future specifications emanating from the Internet Assigned Number Authority (IANA), on which subject information can be found on the World Wide Web site www.iana.org, or from the Active Network Assigned Number Authority (ANANA).

In one embodiment of the invention, the access control gateway determines whether a message must be transmitted on receiving the message.

In a second embodiment, the access control gateway determines whether a message must be transmitted only for the first message of a stream, i.e. for the first message of a set of messages having the same sender, the same receiver or receivers, and the same network characteristics (protocol, port, etc.). The decision (to transmit the message or not) is then applied to all the other messages of the stream.

The decision taken by the filter means of the access control gateway can be of various kinds.

Firstly, it could be a rejection decision, in which case the message (or the stream) is not transmitted to the domain controlled by the access control gateway.

Another decision could be to transmit the message but to convert it into a passive message, in which case it can be transmitted in the domain D controlled by the access control gateway but without generating any processing and thus without consuming processing resources. If the receiver of the message is outside the domain D, the message can leave the domain D and be converted back into an active message, such reactivation of the message being effected either by the last node of the domain D through which it passes or by an access control gateway of another domain (for example the domain of the receiver of the message).

Messages can be marked conventionally, i.e. a field (in the header, for example) can indicate if a message is an active message or a passive message. In this case, conversion into a passive message merely consists in modifying the value of this field.

Another solution is to leave this field alone, so that it indicates an active message, but to indicate in another field that the message must not be processed by the routing systems handling it. For example, this field could be the field indicating the execution environment, which would then take a special value.

Another decision, encompassing the preceding decision, would be to transmit the message and allocate a limited quantity of processing resources, in which case it can be transmitted in the domain controlled by the access control gateway, with each active node processing the message only within the limits of the resources allocated to the message in question.

Using this method, a message can be transmitted with a resource allocation equal to zero, which corresponds to transmitting a message as if it were not active. The advantage of this is that if the message is transmitted to another domain made up of active nodes it can be allocated non-zero processing resources and be processed as an active message.

This allocation of processing resources can be effected conventionally by placing the corresponding value in a dedicated field. Modifying the allocation of processing resources simply consists in modifying the value of this field.

Another decision that could be taken by the filter means of the access control gateway is to accept the message and transmit it in the controlled domain without modification. If the access control gateway also has a routing function, it can transmit the message to its routing system, and if it has an execution environment, it can transmit the message to that environment and initiate specific processing.

The decision can be taken by the filter means on the basis of information inserted into the received messages, as previously described.

It can also be based on a profile database that the filter means can access. The profile database can be contained in the access control gateway, for example, and match message sender identifiers and authorization parameters.

The profile database can correspond to agreements entered into between customers and the operator managing the domain controlled by the access control gateway.

Accordingly, a customer identified by a sending address (typically an IP address) may have entered into an agreement providing only for the transmission of passive messages and not for the transmission of active messages. In this case, the profile database can indicate the customer's rights of access in the form of authorization parameters, and the filter means can accept or reject messages coming from this customer as a function of their status (active, passive).

Similarly, a customer might have entered into an agreement providing for only some types of execution environment. In this case, the field indicating the execution environment required to process the message must also be tested, and a decision taken as a function of the match between the execution environments covered by the agreement and the execution environment indicated in the message.

In the embodiment of the invention shown in FIG. 2, the data filter means can operate in collaboration with a control server S.

For example, the control server can be an active code server conventionally used to supply active code to the nodes of an active network.

The collaboration between the access control gateway E and the control server S can be implemented by means of a communications protocol, for example the Common Open Policy Service (COPS) protocol defined by RFC 2748 of the Internet Engineering Task Force (IETF).

The collaboration can be implemented in two modes:
In one mode, the access control gateway E interrogates the control server S when necessary (i.e. each time an active packet, or the first packet of a stream of active packets, is received). The control server S decides whether to transmit the active packet or packets. It transmits its response to the access control gateway E which initiates transmission of the packets, or not, as a function of that response.
In the other mode the control server S transmits a set of rules to the access control gateway E.

The access control gateway uses these rules to decide whether to transmit the active packets received.

In an embodiment using the COPS protocol, the first mode conforms to the Outsourcing mechanism and the second to the Provisioning mechanism.

In the first mode, on receiving an active packet, the access control gateway first determines the information pertinent to the access control function contained in the active packet. This information typically includes an identifier of the active code and data relating to the execution environment required for the active code.

This information is then extracted and inserted into a protocol message sent to the control server S. In the light of this information, the control server S can decide whether the active packet can be transmitted in the domain; if it can be transmitted, it decides whether other operations must be carried out (for example, converting the packet into a passive message, or allocating it limited processing resources, as explained above).

The control server S then transmits its decision to the access control gateway E, which can implement the decision by means of the filter means.

The invention claimed is:

1. An access control gateway for controlling access to a first data network from a second data network, the gateway including means for receiving data from said second network and said gateway further including filter means for filtering said data coming from a second data network, said data being formatted in the form of active or passive messages, an active message being a message which requires specific processing, and a passive message being a message which does not require specific processing, wherein said filter means decides whether to transmit said data to said first network as a function of information contained in said data and relating to the processing of said data by active routing systems of said first network, said information comprising first information about whether or not the message requires specific processing, and second information about the environment necessary for the active routing systems of said first network to execute message processing, said filter means deciding whether to transmit said data to said first network as a function of said second information.

2. An access control gateway according to claim 1, wherein said filter means are adapted to access a profile database matching identifiers of the sender of said data and authorization parameters in order to decide whether to transmit.

3. An access control gateway according to claim 1, wherein said filter means are adapted to convert active messages into passive messages.

4. An access control gateway according to claim 1, wherein said filter means are adapted to allocate active messages a quantity of processing resources.

5. An access control gateway according to claim 1, wherein said filter means can operate in collaboration with an access server (S).

6. An access control gateway according to claim 5, wherein said filter means are adapted to transmit some of said data to said access server and to implement a decision received from said access server.

7. An access control gateway according to claim 6, wherein communications with said access server conform to the COPS protocol.

8. A method of transmitting to a first network, which is a data network, data message coming from a second network, which is an access network, via an access control gateway, characterized in that said method includes the following steps:
    detecting first information contained in data in said message about whether or not the message requires specific processing by active routing systems of said first network, and second information in said data about the environment necessary for executing message processing, and
    if a message requires specific processing, deciding whether to transmit said message to the first network as a function of said second information.

9. A transmission method according to claim 8, wherein the decision step is preceded by a step of reading a profile database for matching identifiers of the sender of said data and authorization parameters and the decision step is performed as a function of said step of reading the profile database.

10. A transmission method according to claim 8, wherein said message can be an active message or a passive message, and said decision can be to convert an active message into a passive message.

11. A transmission method according to claim 8, wherein said message can be an active message or a passive message, and said decision can be to allocate active messages a quantity of processing resources.

* * * * *